United States Patent [19]

Golser

[11] 4,160,075

[45] Jul. 3, 1979

[54] PROCESS FOR THE PRODUCTION OF FOAMED PLASTICS WITH IMPROVED COMBUSTION CHARACTERISTICS

[75] Inventor: Leopold Golser, Leonding, Austria

[73] Assignee: Chemie Linz Aktiengesellschaft, Austria

[21] Appl. No.: 923,724

[22] Filed: Jul. 11, 1978

[30] Foreign Application Priority Data

Jul. 15, 1977 [DE] Fed. Rep. of Germany ....... 2732105

[51] Int. Cl.$^2$ ................................................ C08J 9/00
[52] U.S. Cl. ................................... 521/158; 521/118; 521/136; 528/44; 528/73
[58] Field of Search ................. 521/136, 158, 118

[56] References Cited

U.S. PATENT DOCUMENTS

| | | | |
|---|---|---|---|
| 2,806,006 | 9/1957 | Proctor | 260/2.5 AM |
| 3,523,093 | 8/1970 | Stomberger | 521/136 |
| 3,632,531 | 1/1972 | Rush | 260/2.5 AM |

FOREIGN PATENT DOCUMENTS

| | | | |
|---|---|---|---|
| 1918181 | 8/1970 | Fed. Rep. of Germany | 260/2.5 BE |
| 908303 | 10/1962 | United Kingdom | 260/2.5 BE |

*Primary Examiner*—Morton Foelak
*Attorney, Agent, or Firm*—Wenderoth, Lind & Ponack

[57] ABSTRACT

Foamed plastics with improved combustion characteristics and good mechanical strength are obtained by condensation of aminoplast precondensates with organic isocyanates in the presence of an acid curing catalyst and an accelerator for polyurethane formation, whereby the precondensate used as starting material is prepared by reacting formaldehyde with urea and/or melamine in a molar ratio of 1.80 to 4.5:1 at pH values of 4 to 9.5, adjusting then the pH to 7.0 to 8.0 and adding urea to obtain a molar ratio of formaldehyde to the total amount of aminoplast forming compound of 1.0–2.1:1.

7 Claims, No Drawings

PROCESS FOR THE PRODUCTION OF FOAMED PLASTICS WITH IMPROVED COMBUSTION CHARACTERISTICS

In the copending application of Leopold Golser et al, Ser. No. 819,503, filed July 26th, 1977, a process for the production of foamed plastics with improved combustion characteristics is described, in which in a condensation reaction of an aminoplast precondensate with an organic isocyanate which is at least bifunctional in the presence of an acid curing catalyst and an accelerator for polyurethane formation selected from the group consisting of tertiary amines and tin salts containing metal organic bonds, an aqueous solution of a water soluble precondensate of formaldehyde and an aminoplast forming compound selected from the group consisting of urea and melamine having a water content of 13 to 40% by weight is added to the organic isocyanate which is already mixed with the accelerator for polyurethane formation, which is used in an amount of 0.5 to 5% by weight, relative to the foamable mixture. At the same time as the aqueous solution of the aminoplast precondensate but separately from it the acid curing catalyst, which is used also in an amount of 0.5 to 5% by weight, relative to the foamable mixture is added. The ratio of water to organic isocyanate prior to the start of the reaction is 0.14 to 1.5 parts by weight of water to 1 part by weight of organic isocyanate. With this process, the production of the aminoplast precondensates is carried out by any one of the conventional methods, as desired, the sole prerequisite being that the aminoplast precondensate is water soluble and, as is already evident from the term "precondensate", contains methylol groups. The molar ratio of formaldehyde to urea is between 1.2 to 2.5:1 and the molar ratio of formaldehyde to melamine is about 1.8 to 4.0:1.

Surprisingly, it has now been found that a decisive increase in the mechanical strength of the foams of low combustibility produced by the process according to the copending application can additionally be achieved when very specific conditions are maintained during the production of the aminoplast precondensates to be employed. Further additional advantages are that the shrinkage of the foams is substantially less and also the foaming process is more uniform and the foam structure is more uniform and more finely cellular. Moreover, the raw material costs for the foam are reduced, since the proportion of formaldehyde, which is expensive compared with urea, is distinctly reduced compared with the process according to the copending application.

It is therefore an object of the present invention to provide in a process for the production of foamed plastics with improved combustion characteristics by a condensation reaction of aminoplast precondensates with organic isocyanates which are at least bifunctional in the presence of an acid curing catalyst and an accelerator for polyurethane formation selected from the group consisting of tertiary amines and tin salts containing metal organic bonds, whereby an aqueous solution of a water soluble precondensate of formaldehyde and an aminoplast forming compound selected from the group consisting of urea and melamine, the solution having a water content of 13 to 40% by weight, is added to the organic isocyanate which is already mixed with the accelerator for polyurethane formation, being used in an amount of 0.5 to 5% by weight, relative to the foamable mixture and at the same time as the aqueous solution of the aminoplast precondensate but separately from it the acid curing catalyst is added, which is also used in an amount of 0.5–5% by weight relative to the foamable mixture, whereby the ratio of water to organic isocyanate prior to the start of the reaction is 0.14 to 1.5 parts by weight of water to 1 part by weight of organic isocyanate the improvement that the water soluble aminoplast precondensate employed is a precondensate of this type in the form of an aqueous solution which has been obtained by reacting formaldehyde with the aminoplast forming compound in a molar ratio of 1.80 to 4.5:1 at elevated temperature, the maximum temperature being the boiling point, and at pH values of 4 to 9.5, subsequently cooling the reaction mixture, adjusting the pH value to 7.0 to 8.0 and dissolving urea in an amount such that the molar ratio of formaldehyde to the total amount of aminoplast forming compound present in the solution is 1.0–2.1:1.

With regard to the characteristics of the foam, a ratio of formaldehyde:aminoplast forming compound of 2.6 to 3.9:1 has been found to be particularly preferential for the hot reaction, whilst in the second stage, that is to say that in which the urea is added after cooling, a formaldehyde:urea ratio of about 1.3 to 1.8:1 is preferred.

It is also possible to use a mixture of urea and melamine as the starting material for the hot condensation reaction. The appropriate range for the molar ratio of urea:melamine for the hot condensation reaction is between 30 and 0.25, preferably 20 to 1.5:1. In general, it can be stated that a higher melamine content in the aqueous precondensate solutions to be employed for production of the foam has an advantageous influence both on the combustion characteristics and on the mechanical properties of the foam.

If urea is employed as the sole aminoplast forming compound, the adjustment of the pH to values between 5 and 6 leads to optimum results. However, if melamine is employed as the aminoplast forming compound in the hot condensation reaction, the reaction is carried out at pH values between 4.5 and 9.5 and preferably in a slightly alkaline range between 8 and 9.5, in order to prevent the reaction with formaldehyde from starting too rapidly. If mixtures of urea and melamine are used as the aminoplast forming compound, the particular optimum pH range for the hot precondensation during condensation will gradually be lowered as the urea content increases and finally the pH range of 5 to 6 which is most advantageous for pure urea employed as the aminoplast forming compound will be reached. So, for example, the condensation reaction is started at a pH value of 8.5 to 9.5, and then the pH is stepwise lowered by reaching a pH value of about 5 at the end of the condensation reaction.

In the second pH stage, the pH is preferably adjusted to values of 7 to 7.6.

The reaction time forrthe hot precondensation and the reaction temperature are, according to experience, such that the condensation proceeds to such an extent that no further precipitation of, for example, methylol compounds occurs when the precondensate solution is stored but does not proceed to such an extent that the viscosity becomes too high. Appropriately, the reaction is carried out at temperatures of 70° C. up to the boiling point. For reasons of economy, operation at the reflux temperature is preferred and in this case reaction times of 15 to 200 minutes are employed.

Under the reaction conditions, such as the adjustment of the pH, the temperature and the like, the reaction of formaldehyde with urea and/or melamine initially leads to monohydric and polyhydric methylol compounds, which partially react further with one another with the elimination of water and thus also form methylene and oxymethylene bridges, at least two methylol compounds being linked to one another. More than half of the formaldehyde employed may be present in the form of methylol groups in the first stage, that is to say the hot reaction. The proportion of formaldehyde which forms methylene groups is in general distinctly below 25%. The concentration of oxymethylene groups is lower and varies in order of magnitude up to about 15%, based on the formaldehyde employed. If, according to the invention, after neutralization and subsequent cooling of the aqueous condensate, urea is added to the solutions until the ratio of formaldehyde:aminoplast forming compound according to the invention is obtained, virtually only methylol groups form between the formaldehyde present and the urea added.

The Examples which follow are intended to illustrate the process according to the invention in more detail. The results obtained under laboratory conditions using mechanical stirrers can be scaled up, after appropriate preliminary tests, to foaming machines of conventional design.

EXAMPLE 1

1,243.7 g of urea were dissolved in 5,400 g of formalin (36% strength) at about 40° C., with stirring, and the pH value was then adjusted to 5.00 and kept at this value. The solution was heated to the reflux temperature in the course of 40 minutes and kept at this temperature for 80 minutes.

After the pH value had been increased to 7.50, water was distilled off under reduced pressure until a water content of 30% was reached. The formaldehyde:urea ratio was 3.13:1.

184.3 g of urea were dissolved in 485.0 g of this precondensate solution at room temperature, with stirring. The molar ratio of formaldehyde:urea was then 1.30:1.

200 g of this solution were added, at the same time as but separately from 5.30 g of benzoyl chloride, to a mixture, prepared immediately beforehand, of 50.0 g of crude diphenylmethane diisocyanate, 3.0 g of foam stabilizer, 4.0 g of triethanolamine and 0.60 g of dimethylethanolamine and the resulting mixture was intensively stirred mechanically for 10 seconds. The foam formed in this way had the following data:
 Start time: 15 seconds
 Rise time: 127 seconds
 Tack-free after: 127 seconds
 Density: 42.4 kg/m$^3$
 Compressive stress at 10% compression according to DIN 53,421: 0.18 N/mm$^2$.

EXAMPLE 2

205.4 g of urea were dissolved in 445 g of the precondensate solution with a formaldehyde:urea ratio of 3.13:1, described under 1, which had been evaporated to a water content of 15%, so that the molar ratio of formaldehyde:urea was 1.30:1.

200 g of this solution were foamed as under 1. The foam thus obtained had the following data:
 Start time: 15 seconds
 Rise time: 125 seconds
 Tack-free after: 125 seconds
 Density: 16.5 kg/m$^3$ The strength of this markedly low-density foam, given as compressive stress at 10% compression according to DIN 53,421, was 0.04 N/mm$^2$.

EXAMPLE 3

A hot solution, at about 85° C., of 72.6 g of melamine in 144.2 g of formalin (36.3% strength) was added to a solution, warmed to about 85° C., of 310.9 g of urea in 1,569.4 g of formalin (36.3% strength), at a pH value of 9.0. After rapidly heating the combined solutions to the reflux temperature, the pH value was adjusted to 5.0 with 25% strength formic acid and the condensation reaction was carried out for 30 minutes at this pH value. The pH was then adjusted to 7.5 with 40% strength sodium hydroxide solution, the mixture was cooled and water was distilled off under reduced pressure until the water concentration of the precondensate solution was 22.5%.

The molar ratio of formaldehyde to urea plus melamine in the precondensate solution was 3.60 and the molar ratio of urea to melamine was 9.00. By dissolving 372.5 g of urea in 1,000 g of precondensate solution at room temperature, the molar ratio of formaldehyde to urea and melamine was lowered to 1.50.
 Start time: 13 seconds
 Rise time: 141 seconds
 Tack-free after: 141 seconds
 Density: 23 kg/m$^3$
 Compressive stress at 10% compression according to DIN 53,421: 0.05 N/mm$^2$.

EXAMPLE 4

In a manner similar to that described in Example 3, a precondensate solution was produced in which the molar ratio of formaldehyde to urea plus melamine was 3.90; the molar ratio of urea to melamine was 4.00. The condensation time was shortened to 15 minutes. The pH value during the condensation was 5.0.

289.8 g of urea were dissolved in 1,000 g of this precondensate solution. The molar ratio of formaldehyde to aminoplast forming compound mixture was lowered to 1.61 by this means.

200 g of this solution were foamed as in Example 3, but the amount of benzoyl chloride was increased to 10.0 g:
 Start time: 13 seconds
 Rise time: 89 seconds
 Tack-free after: 105 seconds
 Density: 40 kg/m$^3$
 Compressive stress at 10%
 Compression according to DIN 53,421: 0.15 N/mm$^2$.

What is claimed is:

1. In a process for the production of foamed plastics with improved combustion characteristics by a condensation reaction of aminoplast precondensates with organic isocyanates which are at least bifunctional in the presence of an acid curing catalyst and an accelerator for polyurethane formation selected from the group consisting of tertiary amines and tin salts containing metal organic bonds, whereby an aqueous solution of a water soluble precondensate of formaldehyde and an aminoplast forming compound selected from the group consisting of urea and melamine, the solution having a water content of 13 to 40% by weight, is added to the organic isocyanate which is already mixed with the accelerator for polyurethane formation, being used in an amount of 0.5 to 5% by weight relative to the foamable mixture and at the same time as the aqueous solution of the aminoplast precondensate but separately from it the acid curing catalyst is added, which is also used in an amount of 0.5 to 5% by weight, relative to the foamable mixture, whereby the ratio of water to organic isocyanate prior to the start of the reaction is 0.14 to 1.5 parts by weight of water to 1 part by weight of organic isocyanate the improvement wherein the water soluble aminoplast precondensate employed is a precondensate of this type in the form of an aqueous solution which has been obtained by reacting formaldehyde with the aminoplast-forming compound in a molar ratio of 1.80 to 4.5:1 at elevated temperature, the maximum temperature being the boiling point, and at pH values of 4 to 9.5, subsequently cooling the reaction mixture, adjusting the pH value to 7.0 to 8.0 and dissolving urea in an amount such that the molar ratio of formaldehyde to the total amount of aminoplast forming compound present in the solution is 1.0–2.1:1.

2. The process as claimed in claim 1, in which a molar ratio of formaldehyde to the aminoplast forming compound of 2.6 to 3.9:1 is maintained during the condensation reaction at pH values of 4 to 9.5.

3. The process as claimed in claim 1, in which the aminoplast precondensate, which is employed for the reaction with the organic isocyanate, has a molar ratio of formaldehyde to the aminoplast forming compound of 1.3 to 1.8:1.

4. The process as claimed in claim 1, in which the aminoplast forming compound is urea only and the reaction with formaldehyde is carried out at elevated temperature at a pH value of 5 to 6.

5. The process as claimed in claim 1, in which the aminoplast forming compound is a mixture of melamine and urea, melamine alone being employed for the condensation reaction with formaldehyde at elevated temperature and this condensation reaction being carried out at pH values of 8 to 9.5

6. The process as claimed in claim 1, in which the aminoplast forming compound is a mixture of melamine and urea, a mixture of urea and melamine being employed for the condensation reaction with formaldehyde at elevated temperature, whereby the pH-value of the reaction mixture is stepwise lowered by having a pH-valve of 8.5 to 9.5 at the beginning and a pH-value of 5 to 6 at the end of the condensation reaction.

7. The process as claimed in claim 1, in which the temperature during the condensation reaction of formaldehyde with the aminoplast forming compound is from 70° C. up to the boiling point of the reaction mixture.

* * * * *